US011209562B2

(12) United States Patent
Savels et al.

(10) Patent No.: US 11,209,562 B2
(45) Date of Patent: Dec. 28, 2021

(54) METHOD FOR DEGHOSTING SEISMIC DATA ACQUIRED BY A MARINE SEISMIC SOURCE AND RECEIVER ASSEMBLY

(71) Applicant: SHELL OIL COMPANY, Houston, TX (US)

(72) Inventors: Tom Savels, Rijswijk (NL); Jan Willem De Maag, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 1174 days.

(21) Appl. No.: 14/441,225

(22) PCT Filed: Nov. 8, 2013

(86) PCT No.: PCT/EP2013/073242
§ 371 (c)(1),
(2) Date: May 7, 2015

(87) PCT Pub. No.: WO2014/072387
PCT Pub. Date: May 15, 2014

(65) Prior Publication Data
US 2015/0285935 A1 Oct. 8, 2015

(30) Foreign Application Priority Data
Nov. 9, 2012 (EP) .................................. 12191926.0

(51) Int. Cl.
*G01V 1/36* (2006.01)
*G01V 1/38* (2006.01)
(52) U.S. Cl.
CPC .............. *G01V 1/36* (2013.01); *G01V 1/364* (2013.01); *G01V 1/38* (2013.01); *G01V 2210/56* (2013.01)

(58) Field of Classification Search
CPC ... G01V 1/36; G01V 1/28; G01V 1/00; G01V 1/364; G01V 1/366; G01V 1/38; G01V 2210/56; G01V 2210/50; G01V 2210/00
(Continued)

(56) References Cited

U.S. PATENT DOCUMENTS 5,583,825 A 12/1996 Carrazzone et al.
6,219,621 B1 4/2001 Hornbostel
(Continued)

FOREIGN PATENT DOCUMENTS

WO 2012074612 A1 6/2012

OTHER PUBLICATIONS

Hokstad et al., "3D Surface-related Multiple Elimination Using Parabolic Sparse Inversion", Geophysics, vol. 71, Issue No. 6, Jan. 1, 2006, pp. V145-V152, XP001522524.
(Continued)

*Primary Examiner* — Mohamed Charioui
(74) *Attorney, Agent, or Firm* — Shell Oil Company

(57) ABSTRACT

In a method for deghosting seismic data acquired by a marine seismic source and receiver assembly effects of seismic reflections by the water surface, known as ghost signals, are removed by a deghosting algorithm, which transforms input seismic data with the surface ghost reflections into source- and receiver-deghosted seismic data using a sparse-inversion technique both for hydrophone and/or geophone recordings, which technique includes equation (26), thereby considerably improving usable bandwidth and giving rise to a significant imaging uplift.

6 Claims, 8 Drawing Sheets

Detailed view of BP2004 synthetics after reverse-time migration.

(58) Field of Classification Search
USPC .......................................................... 702/17
See application file for complete search history.

(56) References Cited

U.S. PATENT DOCUMENTS

| | | | |
|---|---|---|---|
| 8,467,265 | B2 | 6/2013 | van Manen et al. |
| 8,923,091 | B2 | 12/2014 | Lambert |
| 9,784,860 | B2 | 10/2017 | Lambert et al. |
| 2011/0178714 | A1 | 7/2011 | Ozdemir et al. |
| 2012/0025375 | A1 | 2/2012 | Lam |
| 2013/0226463 | A1* | 8/2013 | van Borselen ........... G01V 1/36 702/17 |
| 2013/0286777 | A1* | 10/2013 | Frijlink .................. G01V 1/364 367/24 |

OTHER PUBLICATIONS

Van Dedem et al., "3D Surface Related Multiple Prediction Using Sparse Inversion: Experience with Field Data", Seg International Exposition, 72nd Annual Meeting, Oct. 1, 2002, pp. 1-4, XP002556056.

Van Dedem et al., 3D Surface-Related a Sparse Inversion Multiple Prediction: Approach, Geophysics, vol. 70, Issue No. 3, May 23, 2005, pp. V31-V43, XP002556057.

Van Groenestijn et al., "Estimating Primaries by Sparse Inversion and Application to Near-offset Data Reconstruction", Geophysics, vol. 74, Issue No. 3, May 1, 2009, pp. A23-A28, XP001522524.

Lin et al., "Robust Source Signature Deconvolution and the Estimation of Primaries by Sparse Inversion", Seg San Antonio 2011 Annual Meeting, pp. 4354-4359, XP002695268.

Van Groenestijn et al. "Estimation of Primaries and Near-offset Reconstruction by Sparse Inversion: Marine Data Applications", vol. 74, 2009, pp. R119-R128, XP002695269.

Kluver et al., "A Robust Strategy for Processing 3d Dual-sensor Towed Streamer Data", Seg Houston 2009 International Exposition and Annual Meeting, pp. 3088-3092.

Billette et al., "The 2004 BP Velocity Benchmark", 67th Conference and Technical Exhibition, EAGE, Expanded Abstracts, 2005, 4 pages.

FB. "PGS tackles the source of ghosts", First Break, vol. 29, Jun. 2011, 1 page.

Van GROENESTIJN et al., "Primary estimation on OBC data by sparse inversion", SEG San Antonio 2011 Annual Meeting, pp. 3531-3535.

Kragh et al., "A Method for Efficient Broadband Marine Acquisition and Processing", 71st Eage Conference & Exhibitions, Jun. 8-11, 2009, 6 pages.

International Search Report and Written Opinion received for PCT Patent Application No. PCT/EP2013/073242, dated Aug. 25, 2014, 04 pages.

Moldoveanu et al., "Vertical source array in marine seismic exploration", SEG 2000 Annual meeting, pp. 53-56.

Posthumus, "Deghosting using a twin streamer configuration", Geophysical Prospecting, vol. 41, 1993, pp. 267-286.

Sablon et al., "Processing Variable-depth Streamer Data—First Attempt", 73rd EAGE Conference & Exhibition, 2011.

Savels et al., "Surface-multiple attenuation through sparse inversion:results for complex synthetics and real data" First Break, 2011, vol. 29, pp. 55-64.

Soubaras, "Deghosting by joint deconvolution of a migration anda mirror migration", SEG Denver 2010 Annual Meeting, 2010, pp. 3406-3410.

Soubaras et al., "Variable-depth streamer acquisition—broadband data for imaging and inversion", 73rd EAGE Conference & Exhibition, 2011, pp. 2364-2368.

Soubaras et al., "Variable Depth Streamer—The New Broadband Acquisition System", SEG San Antonio 2011 Annual Meeting, pp. 4349-4353.

Tenghamn et al., "Geostreamer—Increasing the signal-to-noise ratio using a dual-sensor towed streamer"First Break, vol. 27, 2009, pp. 45-51.

Toxopeus et al., "Advanced Geohazards Assessment in Shallow Water through the Estimation of Primaries by Sparse Inversion", SEG San Antonio 2011 Annual Meeting, pp. 3526-3530.

Tu et al., "Migration with surface-related multiples from incomplete seismic data", SEG San Antonio 2011 Annual Meeting, pp. 3222-3227.

Verschuur et al., "Seismic migration of blended shot records with surface-related multiple scattering", Geophysics, 2011, vol. 76.

Van Borselen et al., "Removal of surface-related wave phenomena—The marine case", Geophysics, vol. 61, 1996.

\* cited by examiner

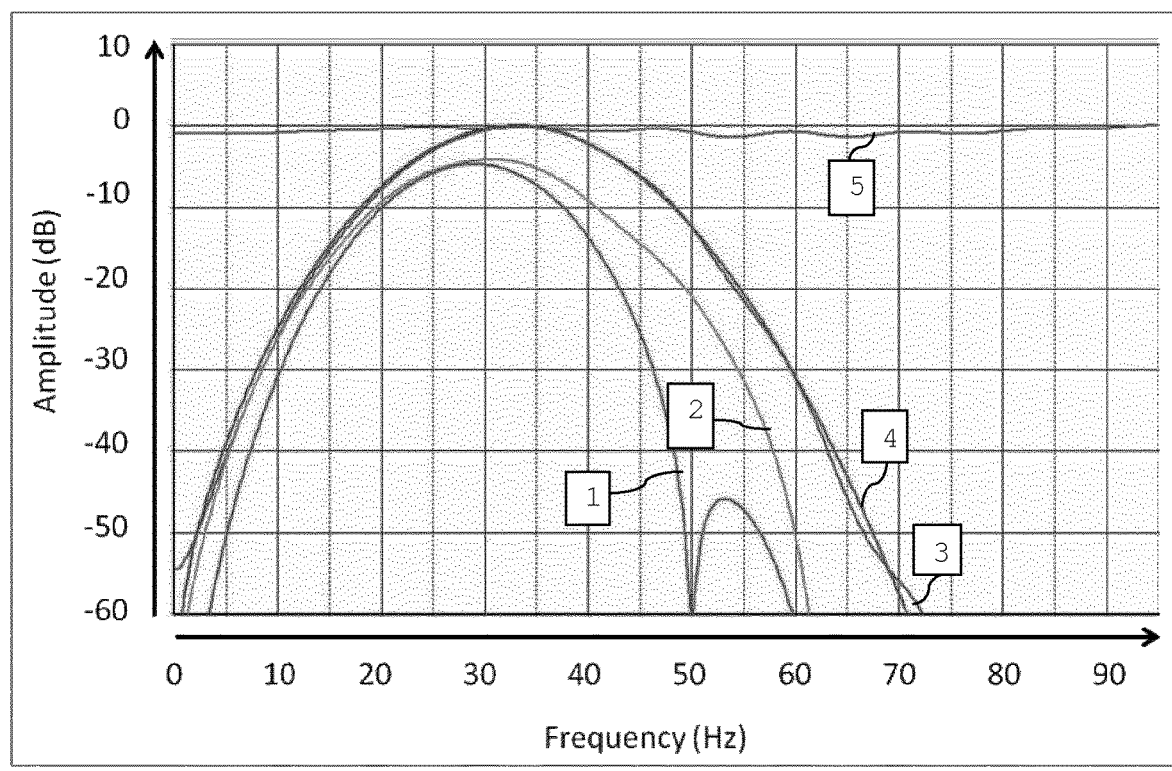
Figure 1: Deghosting results on a simple one-reflector data set

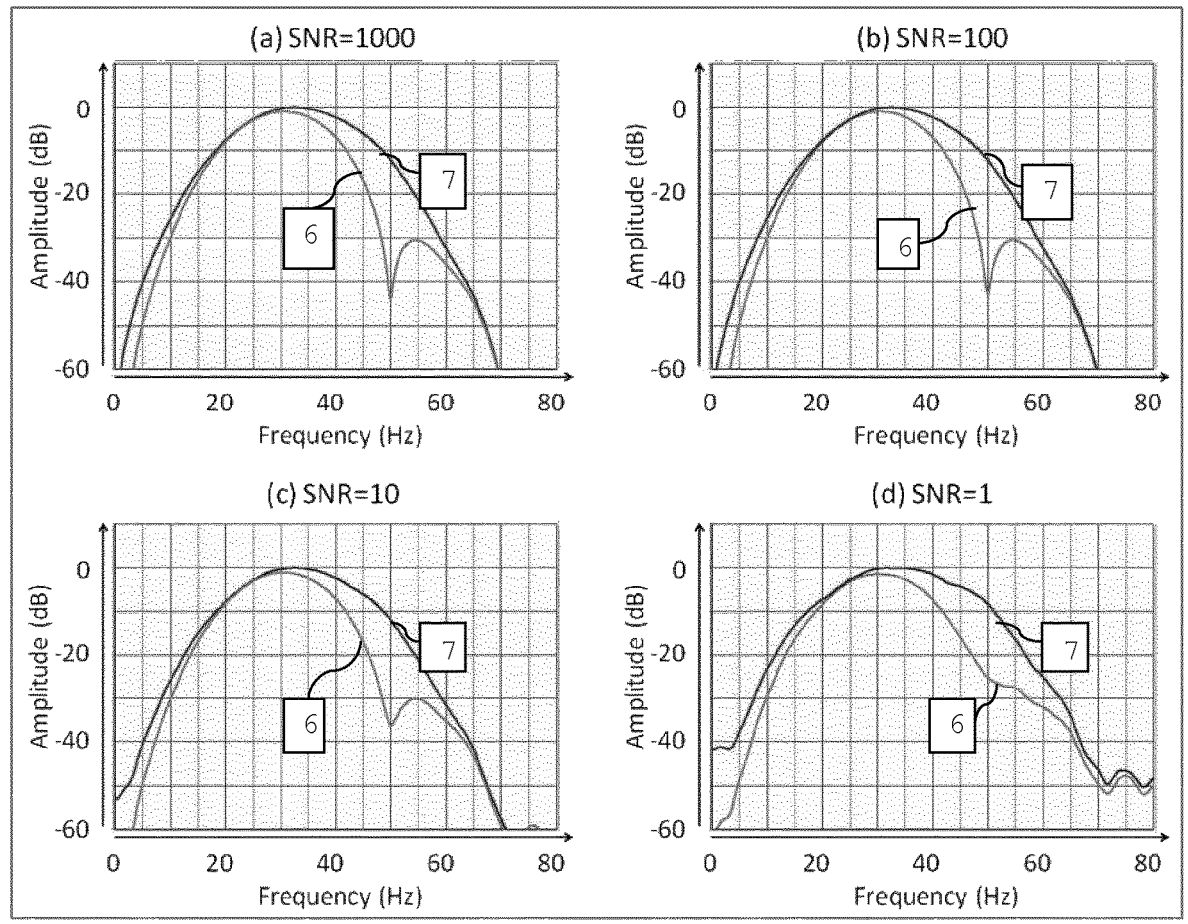
Figure 2: Deghosting results on a simple one-reflector data set to which random noise is added beforehand with the denoted SNR.

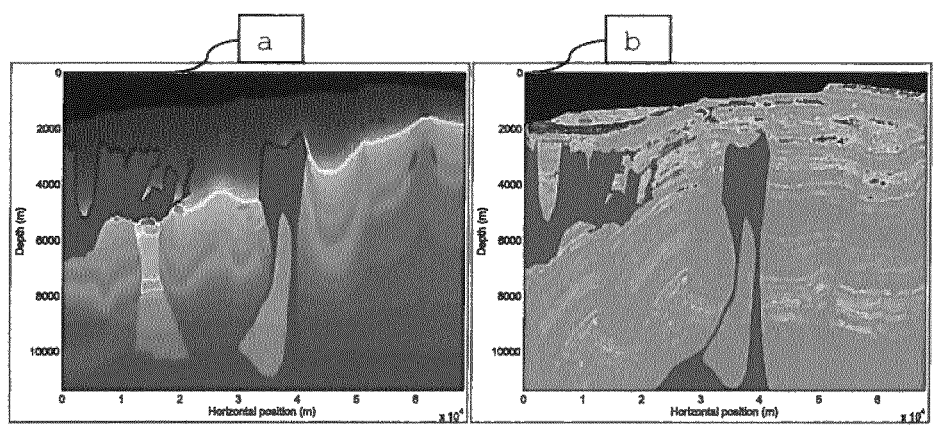
Figure 3: The BP2004 velocity (a, left) and density (b, right) model.

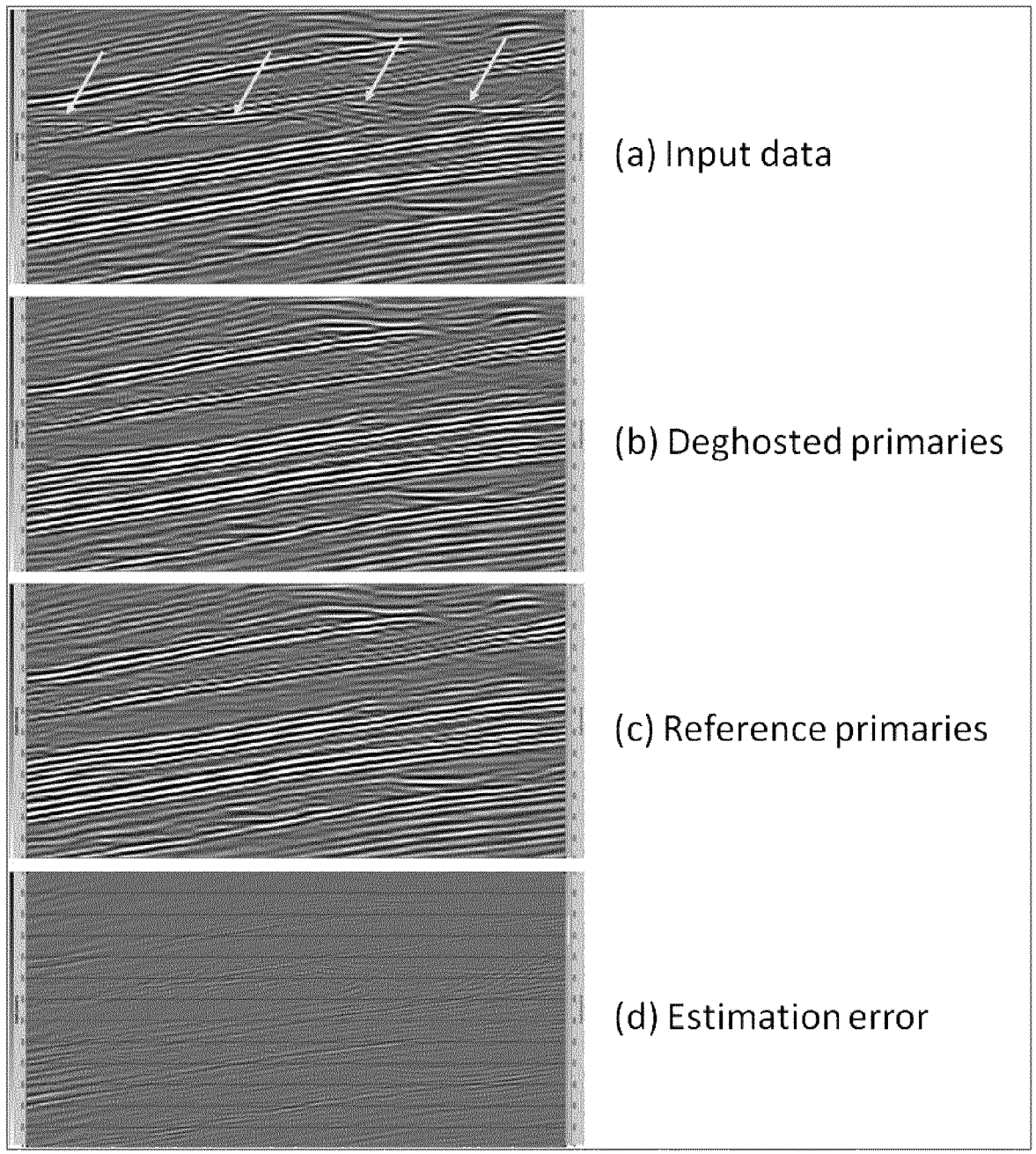
Figure 4: Detailed view of BP2004 synthetics after reverse-time migration.

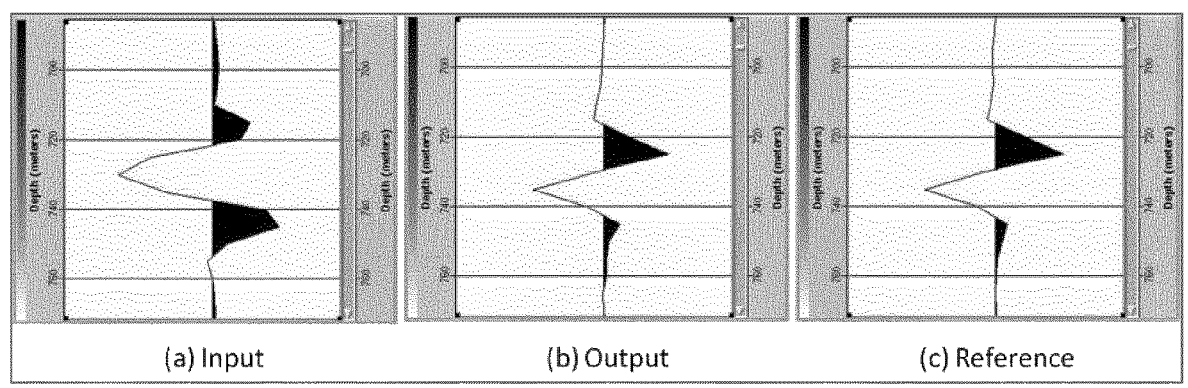
Figure 5: Detailed view of the water bottom reflection of BP2004 synthetics.

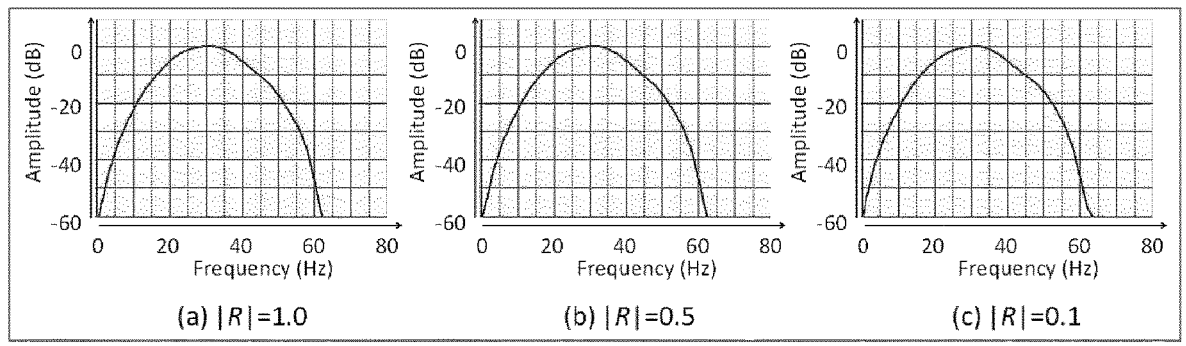
Figure 6: Spectra of deghosted primaries for a one-reflector synthetic similar to the one described in Figures 1 and 2, for different values of the surface reflection coefficient. Note that the deghosting results are stable as $|R|$ varies.

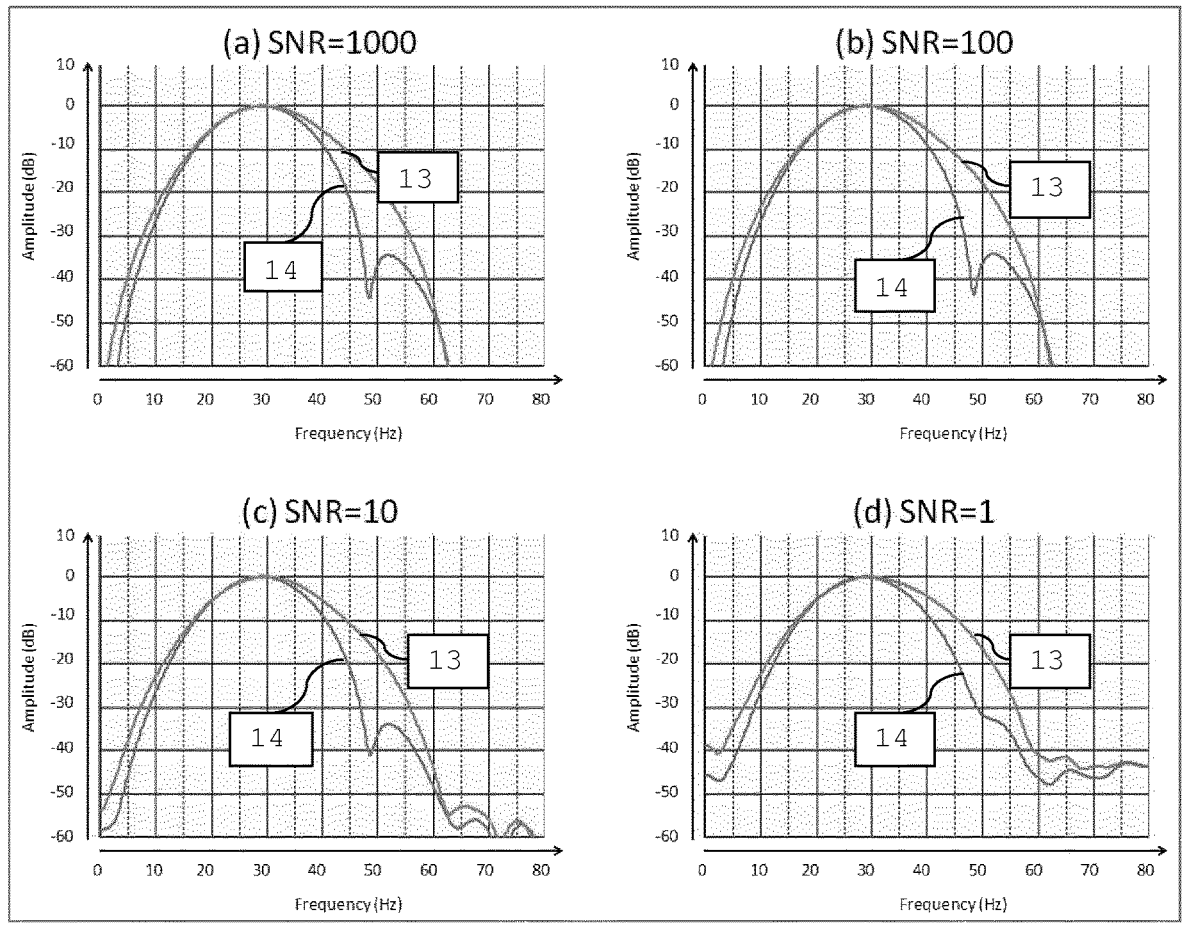
Figure 7: Deghosting results on a simple one-reflector data to which random noise is added beforehand with the denoted SNR, deghosted using residual (26), i.e., with sparseness but without simultaneous multiple attenuation.

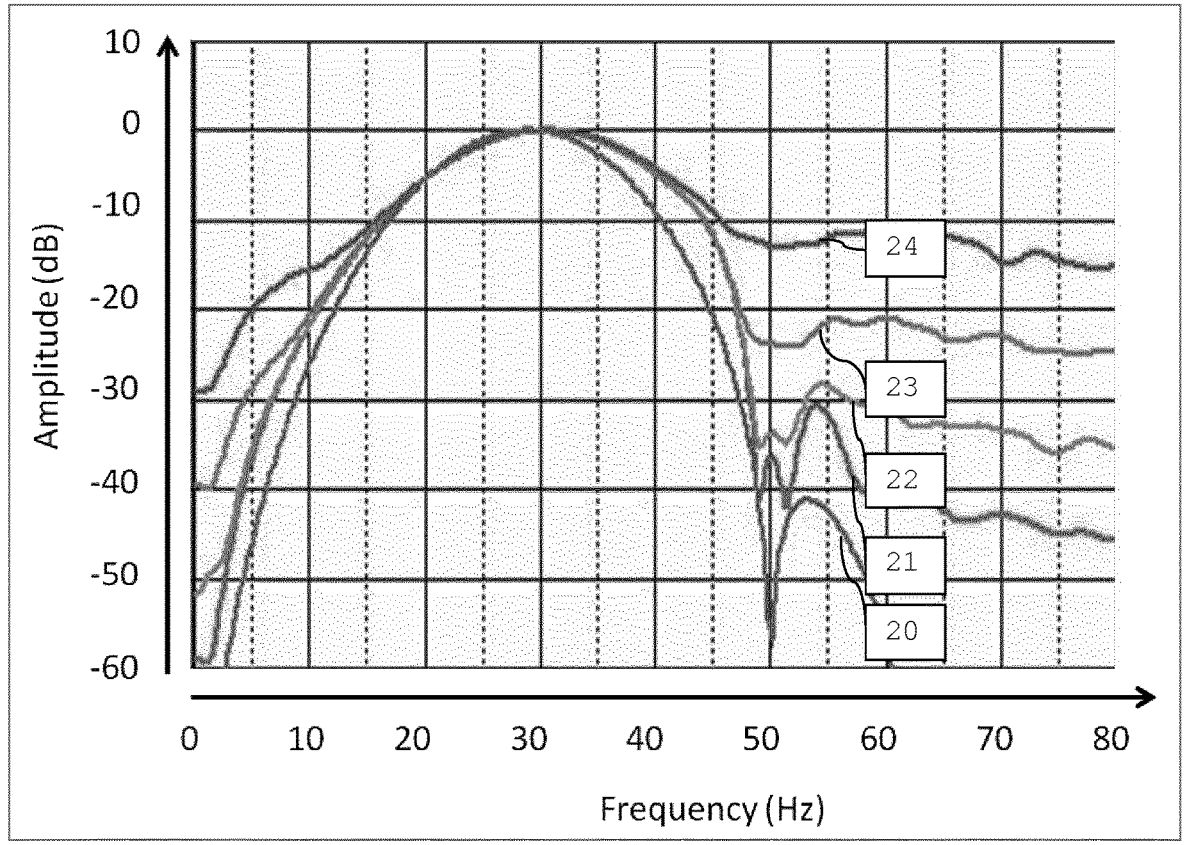
Figure 8: Deghosting results on a simple one-reflector data set using residual (27), i.e. without sparseness nor simultaneous multiple attenuation.
Random noise with a Signal to Noise Ratio (SNR) between 1 and 1000 was added to the input data before running the deghosting flow (20: input, 21: SNR=1000, 22: SNR=100, 23: SNR=10, 24: SNR=1).

METHOD FOR DEGHOSTING SEISMIC DATA ACQUIRED BY A MARINE SEISMIC SOURCE AND RECEIVER ASSEMBLY

CROSS-REFERENCE TO RELATED APPLICATIONS

The present application is a National Stage (§ 371) application of PCT/EP2013/073242, filed Nov. 8, 2013, which claims the benefit of European Application No. 12191926.0, filed Nov. 9, 2012, which is incorporated herein by reference in its entirety.

BACKGROUND OF THE INVENTION

The invention relates to a method for deghosting seismic data acquired by a marine seismic source and receiver assembly, wherein effects of seismic reflections by the water surface, known as ghost signals, are removed by a deghosting algorithm.

Known methods for deghosting seismic data acquired by marine seismic source and receiver assemblies are disclosed in International patent applications WO 201194253, WO201191252, WO201191009 and WO201188133.

Furthermore, known deghosting methods are described in 20 scientific publications which are listed at the end of this specification. These 20 scientific publications are sequentially numbered as publications [1]-[20] and throughout other parts of this specification reference to these scientific papers is made by inserting the sequence number(s) of the cited prior scientific paper(s) between square brackets.

Accordingly reference to the first scientific publication [1] "Seismic migration: Imaging of acoustic energy by wavefield extrapolation: A) Theoretical aspects" written by A. J. Berkhout and published by Elsevier, Amsterdam-Oxford-New York in 1982 is abbreviated by the reference [1].

In marine seismic data acquisition, the hydrophones of a towed streamer are for practical reasons located at a shallow but nonzero depth below sea level. This implementation causes hydrophones to sense both an upward travelling reflection wavelet as well as a downward travelling one, the latter having been reflected from the sea surface. This "receiver-ghost" effect causes a series of peaks and notches to appear in the frequency spectrum of the recorded data, effectively limiting the usable bandwidth. In a similar fashion, the nonzero depth of airgun arrays leads to a "source-ghost" effect, leaving an additional imprint on the recorded spectrum.

Because of the bandwidth-limiting character of these ghosts, a lot of interest has been shown in so-called deghosting techniques that allow for the removal of the source- and receiver-ghost. Over the last few years, in particular, there has been a significant rise in newly developed deghosting technologies.

At the receiver side, these methods are based on, e.g., towing multiple streamers at different depths ([6, 9]), deploying variable-depth streamers ([10, 12, 13, 14]) or acquiring dual-sensor data ([15]). At the source side, deghosting techniques such as [8] and, more recently, [3] have been introduced, relying on a multi-depth positioning of source arrays.

There is a need for an improved method for deghosting seismic data acquired by a marine seismic source and receiver assembly, wherein ghost signals are removed by a deghosting algorithm which transforms input hydrophone data into its deghosted signal (thereby considerably improving its usable bandwidth and giving rise to a significant imaging uplift), in a more accurate and efficient manner than known deghosting methods.

There is also a need for an improved deghosting method that can perform simultaneous multiple attenuation.

There is also a need for an improved deghosting method that can be applied to conventional fixed-depth hydrophone data.

Furthermore, there is a need for a more cost-effective deghosting method that does not rely on novel acquisition schemes, and can be applied to previously acquired conventional data sets.

There is also a need for an improved deghosting method that tackles both the source- and the receiver-ghost in a single non-cascaded processing step

SUMMARY OF THE INVENTION

In accordance with the invention there is provided a method for deghosting seismic data acquired by a marine seismic source and receiver assembly, wherein effects of seismic reflections by the water surface, known as ghost signals, are removed by a deghosting algorithm which transforms input seismic data with the surface ghost reflections into source- and receiver-deghosted seismic data using a sparse-inversion technique, wherein the deghosting algorithm comprises a minimization scheme based on the formula:

$$V^{(a)}(\omega) = D^{(a)}(\omega) - G^{(r)}(\omega) X(\omega) G^{(s)}(\omega) W(\omega), \forall \omega$$

where the matrices $V^{(a)}(\omega)$ denote residual terms such that $V^{(a)}_{rs}(\omega)$ is the residual at frequency $\omega$ of the signal from source s at receiver r, the matrices $D^{(a)}(\omega)$ denote acquired data with or without multiples, the matrices $X(\omega)$ denote ghost-free data, the matrices $W(\omega)$ denote the wavelet information, and the matrices $G^{(s,r)}(\omega)$ denote ghost functions, the latter being defined as $$G^{(s)}(x_{s'}, x_s, \omega) = \int dk_{\parallel} e^{ik_{\parallel}(x_s - x_{s'})} \gamma^{(s)}(k_{\perp}, z_s),$$

$$G^{(r)}(x_{r'}, x_r, \omega) = \int dk_{\parallel} e^{ik_{\parallel}(x_{r'} - x_r)} \gamma^{(r)}(k_{\perp}, z_r),$$

$$\gamma^{(r)}(k_{\perp}, z_r) = 2i \sin(k_{\perp} z_r),$$

$$\gamma^{(s)}(k_{\perp}, z_s) = 2i \sin(k_{\perp} z_s)/(2i\, k_{\perp} z_s),$$

$$(\omega/c)^2 = (k_{\parallel})^2 + (k_{\perp})^2,$$

with c the p-wave velocity of the subsurface top layer and $z_{s,r}$ the depth of source (s) and receiver (r).

The deghosting algorithm may furthermore comprise a minimization scheme based on the formula:

$$V^{(p)}(\omega) = D^{(p)}(\omega) - \tilde{G}^{(r)}(\omega) G^{(r)}(\omega) X(\omega) G^{(s)}(\omega) \tilde{G}^{(s)}(\omega) W(\omega), \forall \omega$$

where the matrices $V^{(p)}(\omega)$ denote preconditioned residual terms defined as $$V^{(p)}(\omega) = \tilde{G}^{(r)}(\omega) V^{(a)}(\omega) \tilde{G}^{(s)}(\omega), \forall \omega,$$

the matrices $D^{(p)}(\omega)$ denote preconditioned data terms defined as $$D^{(p)}(\omega) = \tilde{G}^{(r)}(\omega) D^{(a)}(\omega) \tilde{G}^{(s)}(\omega), \forall \omega,$$

and the matrices $\tilde{G}^{(s,r)}(\omega)$ denote preconditioning functions, defined as $$\tilde{G}^{(s)}(x_{s'}, x_s, \omega) = \int dk_{\parallel} e^{ik_{\parallel}(x_s - x_{s'})} \tilde{\gamma}^{(s)}(k_{\perp}, z_s),$$

-continued $$\tilde{G}^{(r)}(x_r, x_{r'}, \omega) = \int dk_{\parallel} e^{ik_{\parallel}(x_{r'}-x_r)} \tilde{\gamma}^{(r)}(k_{\perp}, z_r),$$

$$\tilde{\gamma}^{(r)} = \frac{\gamma^{(r)}}{|\gamma^{(r)}|^2 + \epsilon}, \tilde{\gamma}^{(s)} = \frac{\gamma^{(s)}}{|\gamma^{(s)}|^2 + \epsilon},$$

with $\epsilon \ll 1$.

The deghosting algorithm may furthermore comprise a minimization scheme based on the formula $$V^{(a)}(\omega)=D^{(a)}(\omega)-G^{(r)}(\omega)X_0(\omega)G^{(s)}(\omega)W(\omega)+G^{(r)}(\omega)X_0(\omega)[G^{(r)}(\omega)]^{-1}D^{(a)}(\omega), \forall \omega$$

where the matrices $V^{(a)}(\omega)$ denote residual terms such that $V^{(a)}_{rs}(\omega)$ is the residual at frequency $\omega$ of the signal from source s at receiver r, the matrices $D^{(a)}(\omega)$ denote acquired data with multiples, the matrices $X_0(\omega)$ denote ghost-free and surface-multiple free data, the matrices $W(\omega)$ denote the wavelet information, and the matrices $G^{(s,r)}(\omega)$ denote ghost functions, the latter being defined as $$G^{(s)}(x_{s'},x_s,\omega)=\int dk_{\parallel}e^{ik_{\parallel}(x_s-x_{s'})}\gamma^{(s)}(k_{\perp},z_s),$$

$$G^{(r)}(x_r,x_{r'},\omega)=\int dk_{\parallel}e^{ik_{\parallel}(x_{r'}-x_r)}\gamma^{(r)}(k_{\perp},z_r),$$

$$\gamma^{(r)}(k_{\perp},z_r)=2i \sin(k_{\perp}z_r),$$

$$\gamma^{(s)}(k_{\perp},z_s)=2i \sin(k_{\perp}z_s)/(2i\, k_{\perp}z_s),$$

$$(\omega/c)^2=(k_{\parallel})^2+(k_{\perp})^2,$$

with c the p-wave velocity of the subsurface top layer and $z_{s,r}$ the depth of source (s) and receiver (r).

The deghosting algorithm may furthermore comprise a minimization scheme based on the formula $$V^{(p)}(\omega)=D^{(p)}(\omega)-\tilde{G}^{(r)}(\omega)G^{(r)}(\omega)X_0(\omega)G^{(s)}(\omega)\tilde{G}^{(s)}(\omega)W(\omega)+\tilde{G}^{(r)}(\omega)G^{(r)}(\omega)X_0(\omega)[\tilde{G}^{(r)}(\omega)G^{(r)}(\omega)]^{-1}D^{(p)}(\omega), \forall \omega$$

where the matrices $V^{(p)}(\omega)$ denote preconditioned residual terms defined as $$V^{(p)}(\omega)=\tilde{G}^{(r)}(\omega)V^{(a)}(\omega)\tilde{G}^{(s)}(\omega), \forall \omega,$$

the matrices $D^{(p)}(\omega)$ denote preconditioned data terms defined as $$D^{(p)}(\omega)=\tilde{G}^{(r)}(\omega)D^{(a)}(\omega)\tilde{G}^{(s)}(\omega), \forall \omega,$$

and the matrices $\tilde{G}^{(s,r)}(\omega)$ denote preconditioning functions, defined as $$\tilde{G}^{(s)}(x_{s'}, x_s, \omega) = \int dk_{\parallel} e^{ik_{\parallel}(x_s-x_{s'})} \tilde{\gamma}^{(s)}(k_{\perp}, z_s),$$

$$\tilde{G}^{(r)}(x_r, x_{r'}, \omega) = \int dk_{\parallel} e^{ik_{\parallel}(x_{r'}-x_r)} \tilde{\gamma}^{(r)}(k_{\perp}, z_r),$$

$$\tilde{\gamma}^{(r)} = \frac{\gamma^{(r)}}{|\gamma^{(r)}|^2 + \epsilon}, \tilde{\gamma}^{(s)} = \frac{\gamma^{(s)}}{|\gamma^{(s)}|^2 + \epsilon},$$

with $\epsilon \ll 1$, and wherein the residual may be approximated by $$V^{(p)}(\omega)=D^{(p)}(\omega)-\tilde{G}^{(r)}(\omega)G^{(r)}(\omega)X_0(\omega)G^{(s)}(\omega)\tilde{G}^{(s)}(\omega)W(\omega)+X_0(\omega)D^{(p)}(\omega), \forall \omega$$

by making the assumption that $$\int dk_x e^{ik_x(x-x')}\tilde{\gamma}^{(i)}(k_z,z_i)\gamma^{(i)}(k_z,z_i) \sim \delta(x-x') \text{ for } i=s,r,$$

of which the validity stems from the fact that $\gamma^{(i)}\tilde{\gamma}^{(i)} \approx 1$ away from the ghost notches.

These and other features, embodiments and advantages of the method according to the invention are described in the accompanying claims, abstract and the following detailed description of non-limiting embodiments depicted in the accompanying drawings, in which description reference numerals are used which refer to corresponding reference numerals that are depicted in the drawings. Similar reference numerals in different figures denote the same or similar objects.

BRIEF DESCRIPTION OF THE DRAWINGS

FIG. 1 shows results of use of the deghosting method according to the invention on a simple one-reflector data set;

FIG. 2 shows results of use of the deghosting method according to the invention on a simple one-reflector data set in the presence of noise;

FIG. 3 shows the BP2004 velocity (a, left) and density (b, right) model;

FIG. 4 provides a detailed view of BP2004 synthetics after reverse-time migration;

FIG. 5 provides a detailed view of use of the deghosting method according to the invention on the water bottom reflection of BP2004 synthetics;

FIG. 6 shows spectra of deghosted primaries for a one-reflector synthetic similar to the one described in FIGS. 1 and 2, for different values of the surface reflection coefficient;

FIG. 7 shows deghosting results on a simple one-reflector data set in the presence of noise, using a residual described in formula (26) with sparseness but without simultaneous attenuation; and FIG. 8 shows deghosting results on a simple one-reflector data set using a residual described in formula (27) without sparseness nor simultaneous multiple attenuation.

DETAILED DESCRIPTION OF THE DEPICTED EMBODIMENTS

In accordance with the invention there is provided a new deghosting algorithm based on an extension of sparse-inversion multiple attenuation.

A key merit of the method according to the invention is that it allows for stable pre-stack deghosting of both source- and receiver-ghost while requiring fixed-depth hydrophone data only. As such, the method according to the invention comprises an algorithm that transforms input hydrophone data with surface multiples into its source- and receiver-deghosted primaries. In addition, it is shown that the deghosting technique according to the invention can be extended to one that does not require simultaneous multiple attenuation.

In a first section of the following description the theory underlying the method according to the invention is explained.

Next, a potential of the method according to the invention is illustrated on an example based on synthetic data in which it is demonstrated that the deghosting estimations made in accordance with the method according to the invention match the corresponding synthetic reference.

In addition, it is shown that the deghosting method according to the invention is stable in the presence of noise.

The deghosting method according to the invention is different from the aforementioned deghosting techniques described in the list of 20 prior art references in at least two senses.

1) First, the deghosting method according to the invention only comprises a processing flow only and can be applied to conventional fixed-depth hydrophone data; as such, it promises to be cost-effective since it does not rely on novel acquisition schemes, and can be applied to previously acquired conventional data sets.

2) Second, the method according to the invention tackles both the source- and the receiver-ghost in a single non-cascaded processing step. The method according to the invention produces output data that exhibits a significant bandwidth broadening with respect to the input, allowing for pronounced improvement of the subsequent imaging.

In the next section the underlying theory of the method according to the invention is described.

This section illustrates that the approach according to the invention is an extension of the recently introduced multiple attenuation through sparse inversion ([5]). This allows us to build upon the existing sparse-inversion framework, while adding our own new deghosting functionality.

Next, the approach according to the invention is used on synthetic data, showing that the approach according to the invention is robust in the presence of noise.

In addition, a comparison with a synthetically modeled deghosted reference further underpins the accuracy of our deghosting. Finally, it is shown that the algorithm according to the invention can be extended to allow for source- and receiver-deghosting without the need for simultaneous multiple attenuation. Such extension not only broadens the applicability of our method, but also allows for a significant reduction of its associated runtime.

The deghosting approach according to the invention builds upon the foundations of the recently introduced sparse-inversion multiple attenuation technique (EPSI) disclosed in [5].

To facilitate further discussion, the derivation below is started by briefly describing the existing EPSI approach known from [5].

The description of the EPSI fundamentals known from [5] then allows to subsequently elaborate on the specifics of new deghosting functionality provided by the method according to the invention.

The surface-multiple attenuation algorithm proposed by [5] entails the estimation of primaries through sparse inversion. The key merits of this known approach are its ability to attenuate (surface) multiples of a wide range of orders and periodicities, its capacity to reconstruct missing (near-offset) data and the fact that it does not rely on an adaptive subtraction but on a minimization of the total data misfit (data minus primaries minus multiples).

Following [5], the sparse-inversion approach separates the upgoing part of the recorded data D into primaries P and surface multiples M such that $$D(\omega)=P(\omega)+M(\omega), \quad (1)$$

for every frequency $\omega$. The primary and multiple data set are parameterized such that $$P(\omega)=X_0(\omega)W(\omega) \quad (2)$$

$$M(\omega)=X_0(\omega)R(\omega)D(\omega), \quad (3)$$

with $X_0$ the earth's impulse response, W the wavelet matrix and R describing the surface reflection. The notation of expressions (1)-(3) is chosen such that (see [1]) capitalized quantities denote matrices that represent frequency slices of prestack data volumes. That is, rows such as $D_r(\omega)$ represent common-receiver gathers at receiver r for frequency $\omega$; conversely, columns such as $D_{\cdot,s}(\omega)$ represent common-shot gathers for that frequency. The aim of the sparse inversion method is to estimate both the deconvolved primaries $X_0$ and the wavelet information contained in W by minimizing the total data residual V $$V(\omega)=D(\omega)-P(\omega)-M(\omega). \quad (4)$$

The minimization of expression (4) as a function of $X_0$ and W lies at the heart of the EPSI approach. Starting from (4), different implementation strategies have been published that aim at minimizing this data residual. These approaches include the original steepest-descent method with dynamic thresholding ([5]), image-domain approaches ([17, 18]), and compressive-sensing algorithms ([7]). What these methods have in common is that they assist the minimization process by imposing a sparseness constraint; what differentiates them is the domain in which such sparseness is applied. The approach that is used to generate the examples below is based on an efficient implementation of the original method. We do note, however, that this choice is mere practical in nature; our deghosting methodology is in principle independent of the sparseness approach that is taken and can be implemented in any EPSI framework of preference.

To introduce the deghosting algorithm according to the invention into the EPSI framework, precision is required about the assumptions that the equations (1)-(4) impose on the data sets of interest (see, e.g., [19]). At the receiver side, EPSI assumes that the wavefield is upgoing only and measured at zero depth. In other words, the input data is assumed to be free of receiver-ghosts. At the source side, it is similarly assumed that no source-ghost is present. In addition, the source is assumed to be an ideal dipole if we restrict ourselves henceforth to a formulation with an isotropically reflecting surface $(R(\omega)=-1)$ without obliquity effect. Although the latter assumption is not restrictive for our deghosting functionality, it facilitates the discussion further on (the formulation below still holds for a monopole source, given proper inclusion of an obliquity factor). Given these assumptions, we can write $$V(\omega)=D(\omega)-X_0(\omega)W(\omega)+X_0(\omega)D(\omega), \quad (5)$$

with D receiver-deghosted data from an ideal dipole at the surface.

The effect of a receiver-ghost on expression (5) can now be described by introducing the receiver-ghost operator $$\gamma^{(r)}(k_z,z_r)=2i\,\sin(k_z z_r), \quad (6)$$

in which $z_r$ is the receiver depth and $k_z$ the vertical component of the wave vector, and in which we omitted the trivial phase factor $e^{ik_z z_r}$ for notational simplicity.

It is observed that equation (6) is representative for a hydrophone (pressure) reading, and that for geophone (acceleration) readings an equivalent equation holds whereby the term $\sin(k_z z_r)$ is replaced by $\cos(k_z z_r)$.

If we retain ourselves to 2D notations henceforth, we can introduce the expanded notation $$D_{rs}(\omega) \equiv D(x_r,x_s,\omega). \quad (7)$$

Applying the receiver-ghost operator to $D(\omega)$, for example, then leads to $$\begin{aligned}D^{(r)}(x_r,x_s,\omega) &= \int dk_x e^{-ik_x x_r} D(k_x,x_s,\omega)\gamma^{(r)}(k_z,z_r) \\ &= \int dk_x e^{-ik_x x_r} \int dx_{r'} e^{ik_x x_{r'}} D(x_{r'},x_s,\omega)\gamma^{(r)}(k_z,z_r) \\ &= \int dx_{r'} G^{(r)}(x_r,x_{r'},\omega) D(x_{r'},x_s,\omega), \text{ with}\end{aligned} \quad (8)$$

-continued $$G^{(r)}(x_r, x_{r'}, \omega) = \int dk_x e^{ik_x(x_{r'}-x_r)} \gamma^{(r)}(k_z, z_r), \quad (9)$$

the receiver-ghost matrix. Returning to our shorthand notation, we observe that expression (8) can be written as $$D_{r,s}^{(r)}(\omega) = \sum_{r'} G_{r,r'}^{(r)}(\omega) D_{r',s}(\omega), \quad (10)$$

and hence $$D^{(r)}(\omega) = G^{(r)}(\omega) D(\omega). \quad (11)$$

Expression (11) reveals that the effect of a receiver-ghost can be regarded as a simple matrix multiplication per frequency slice.

Next, we focus on discussing the effect of a ghost at the source side. Although the addition of a source-ghost follows a procedure that is similar to what happens at the receivers, there is a subtle distinction between these approaches. This difference between the source- and receiver-side is a consequence of the assumed monopole-versus dipole-character of the receivers and sources. That is, whereas equation (6) allows for the addition of a ghost to a monopole receiver, describing the effect of a source-ghost requires an operator that transforms an ideal dipole source into a monopole source with ghost. To construct such an operator, we note that a monopole can be transformed into a dipole by means of the vertical derivative $ik_z$; combining this monopole-dipole transformation with the ghost function (6) then allows us to describe the effect of a source-ghost on an ideal dipole source by means of the source-ghost operator $$\gamma^{(s)}(k_z, z_s) = \frac{2i \sin(k_z z_s)}{2ik_z z_s}. \quad (12)$$

This operator (12) transforms ideal dipole data into monopole data generated at depth $z_s$, accompanied by its source-ghost. Following a similar approach as on the receiver-side, the effect on the source-ghost can now be translated into $$D^{(s)}(\omega) = D(\omega) G^{(s)}(\omega), \quad (13)$$

with $$G^{(s)}(x_{s'}, x_s, \omega) = \int dk_x e^{ik_x(x_s - x_{s'})} \gamma^{(s)}(k_z, z_s). \quad (14)$$

Using expressions (11) and (13), we can generalize expression (5) in the presence of source- and receiver-ghosts into $$G^{(r)} V G^{(s)} = G^{(r)} D G^{(s)} - G^{(r)} X_0 W G^{(s)} + G^{(r)} X_0 D G^{(s)}, \quad (15)$$

where we omitted the frequency dependence for notational simplicity. The convergence of the deghosting functionality can be significantly enhanced by introducing preconditioning matrices $$\tilde{G}^{(r)}(x_r, x_{r'}, \omega) = \int dk_x e^{ik_x(x_{r'}-x_r)} \tilde{\gamma}^{(r)}(k_z, z_r) \quad (16)$$

$$\tilde{G}^{(s)}(x_{s'}, x_s, \omega) = \int dk_x e^{ik_x(x_s-x_{s'})} \tilde{\gamma}^{(s)}(k_z, z_s), \quad (17)$$

with $$\tilde{g}^{(r)} = \frac{(\gamma^{(r)})^*}{|\gamma^{(r)}|^2 + \varepsilon} \quad (18)$$

$$\tilde{g}^{(s)} = \frac{(\gamma^{(s)})^*}{|\gamma^{(s)}|^2 + \varepsilon},$$

with $\varepsilon \ll 1$. Using preconditioning, we arrive at $$L^{(r)} V L^{(s)} = L^{(r)} D L^{(s)} - L^{(r)} X_0 W L^{(s)} + L^{(r)} X_0 D L^{(s)}, \quad (19)$$

with $$L^{(r)} = \tilde{G}^{(r)} G^{(r)} \quad (20)$$

$$L^{(s)} = G^{(s)} \tilde{G}^{(s)} \quad (21)$$

Although we have introduced the effect of source- and receiver-ghosts, expression (19) is at this point still expressed in terms of upgoing data from an ideal source dipole. We now note that, in the presence of source- and receiver-ghosts, the acquired data can be written as $$D^{(a)} = G^{(r)} D G^{(s)}, \quad (22)$$

and its preconditioned form as $$D^{(p)} = \tilde{G}^{(r)} D^{(a)} \tilde{G}^{(s)} = L^{(r)} D L^{(s)}. \quad (23)$$

Notation (22-23) allows us to rewrite (15) as $$V^{(a)}(\omega) = D^{(a)}(\omega) - G^{(r)}(\omega) X_0(\omega) G^{(s)}(\omega) W(\omega) + G^{(r)}(\omega) X_0(\omega) [G^{(r)}(\omega)]^{-1} D^{(a)}(\omega), \forall \omega$$

and hence $$V^{(p)}(\omega) = D^{(p)}(\omega) - \tilde{G}^{(r)}(\omega) G^{(r)}(\omega) X_0(\omega) G^{(s)}(\omega) \tilde{G}^{(s)}(\omega) W(\omega) + \tilde{G}^{(r)}(\omega) G^{(r)}(\omega) X_0(\omega) [\tilde{G}^{(r)}(\omega) G^{(r)}(\omega)]^{-1} D^{(p)}(\omega), \forall \omega$$

We now make the approximation that the combination of ghost addition and subsequent preconditioning as combined in the L matrices commutes with $X_0$ and W. That is, we assume that $$\int dk_x e^{ik_x(x-x')} \tilde{\gamma}^{(i)}(k_z, z_i) \gamma^{(i)}(k_z, z_i) \sim \delta(x-x') \quad (24)$$

for i=s, r. The validity of this approximations stems from the fact that $\gamma^{(i)} \tilde{\gamma}^{(i)} \approx 1$, away from the notches. Combining (19), (23) and the above commutation approximation finally leads to $$V^{(p)} = L^{(r)} V L^{(s)} = D^{(p)} L^{(r)} X_0 L^{(s)} W + X_0 D^{(p)}, \quad (25)$$

in which the residual $V^{(p)}$ is expressed as a function of acquired and preconditioned data $D^{(p)}$, ghost functions L and the ghost-free quantities $X_0$ and W. Note that, apart from the input data set, the only (albeit crucial) difference between the ideal-data EPSI equation (5) and our new deghosting formulation (25) is the presence of the ghost operators that enclose $X_0$ in the primary term.

Having derived expression (25), we can now formulate the following deghosting workflow 1. If aiming at receiver-deghosting, derive the combined ghost/preconditioning matrix (20) using the receiver depth $z_r$.
2. If aiming at (additional) source-deghosting, derive the combined ghost/preconditioning matrix (21) using the receiver depth $z_s$.
3. Precondition the input data using (23).
4. Run the extended EPSI (25) with preconditioned data and ghost/preconditioning matrices (20)-(21).

The advantage of running the above workflow is twofold. First, it allows for an EPSI formulation on data including its ghost effects. As such, it leads to an improved EPSI multiple attenuation when compared to the to original formulation (5).

Second, the output of our workflow consists of:
- $G^{(r)}X_0G^{(s)}W$, i.e., primaries with their ghost(s)
- $X_0W$, i.e., source and receiver-deghosted primaries.

That is, the above deghosting workflow allows for the simultaneous attenuation of (surface) multiples and removal of source- and receiver-ghosts.

Example 1

To illustrate the effect of the deghosting workflow according to the invention, we start with a simple synthetic example using a simple one-reflector model in a constant-velocity medium (v=1500 m/s) with a reflecting surface. Synthetic data is generated with a source depth of 12 m (first source notch at 62.5 Hz) and a receiver depth of 15 m (first receiver notch at 50 Hz). Data was modeled with a Gabor wavelet with a 30 Hz peak frequency.

FIG. 1 shows the spectra of our corresponding deghosting results. FIG. 1 shows spectra of estimated primaries with source- and receiver-ghost (1), receiver-deghosted primaries (2) and source- and receiver-deghosted primaries (3). Curve (4) shows the spectrum of the synthetically modeled ghost-free data, revealing a nice match with our predictions. Curve (5), finally, shows the spectrum of the deconvolved primaries $X_0$.

First, it is observed that the deghosting workflow according to the invention is able to accommodate for both the receiver- and source-ghost, leading to a significant amplitude recovery around the ghost notches. Second, there is an excellent match of the fully deghosted primaries to the (separately) generated true deghosted signal, underpinning the increased accuracy of the method according to the invention.

To test the stability of the deghosting method according to the invention in the presence of noise, the workflow according to the invention was run on input data to which we added various levels of white noise.

FIG. 2 shows deghosting results on a simple one-reflector data set. Random noise with an SNR between 1 and 1000 was added to the input data before running the deghosting flow. Curve (6) depicts the resulting primary estimations with ghost. Curve (7) shows the corresponding deghosting results.

The stability of the deghosted spectra (7) for varying values of SNR illustrates the robustness of the deghosting workflow according to the invention in the presence of noise.

Example 2

Having described our algorithm's key concepts on a simple example, we now we aim at demonstrating its ability in a complex synthetic setting and present attenuation results on the BP2004 velocity benchmark ([2]).

FIG. 3 shows the BP2004 velocity (a, left) and density (b, right) model. The model has a depth of 12 km and a lateral extent of 67 km. Reflectivity has been implemented through perturbations of the density model.

FIG. 3 shows the P-wave velocity and density model used to generate 2D synthetic data through finite-difference acoustic modelling. Using this model, we generated two data sets. In a first modeling run, we used a shot depth of 5 m and a receiver depth of 15 m, and imposed a reflecting surface boundary condition. Next, we generated a reference data set with a shot depth of ±5 m and receivers at z=0, thereby extending the model for negative z and imposing an absorb-ing boundary condition at the top. Both sets were generated using a 30 Hz Ricker wavelet.

FIG. 4 shows a detailed view of the resulting output after subsequent reverse-time migration and comprises:
  (a) Input data; arrows denote clear surface multiples,
  (b) Estimated receiver-deghosted primaries, which show that clear multiple attenuation was established;
  (c) Modeled receiver-deghosted primaries;
  (d) Difference of estimated and modeled receiver-deghosted primaries, showing a nice match of our predictions (b) and the reference result (c).

First, FIGS. 4(a) and 4(b) show that our workflow allows for clear multiple attenuation on non-deghosted data, having extended the original EPSI method (5) to its deghosting formulation (25).

Second, the match of our output in FIG. 4(b) and its synthetically modeled reference in FIG. 4(c) again underpins the accuracy of our results.

FIG. 5 provides a detailed view of the water bottom reflection of BP2004 synthetics with:
  (a) Input data;
  (b) Estimated receiver-deghosted primary, which shows a pronounced phase change when comparing to the input; and
  (c) Modeled receiver-deghosted primary.

It is observed that at the heart of the deghosting method according to the invention lies the minimization of the residual (25). Besides using the ghosting functions L, this minimization uses two types of information to attain its results:
- surface-multiple information contained in $X_0RD^{(p)}$
- sparseness imposed in the underlying iterative scheme.

Now an evaluation is provided as to what extent each of the above information types contributes to the deghosting capability of the method according to the invention.

First, the deghosting functionality is tested for decreasing values of the surface reflection coefficient R, thereby effectively varying the contribution of surface multiples to the minimization scheme.

FIG. 6 shows the spectra of the resulting deghosted primaries for a one-reflector synthetic similar to the one used in FIGS. 1 and 2, for different values of the surface reflection coefficient. It is observed that, starting from a unity reflection coefficient, the deghosting results are stable as the reflection coefficient decreases.

Such stability implies that the contribution of surface multiples to the deghosting functionality is only of secondary importance, which in turn implies that a minimization scheme based on the residual $$V^{(a)}(\omega)=D^{(a)}(\omega)-G^{(r)}(\omega)X(\omega)G^{(s)}(\omega)W(\omega), \forall \omega \quad (26)$$

and with preconditioning $$V^{(p)}=D^{(p)}-L^{(r)}XL^{(s)}W,$$

also allows for source- and receiver-deghosting, without the need for simultaneous multiple attenuation.

It is observed that this formulation (26) does not require approximation (24), and allows for both deghosting on data with surface multiples (using D and X) as well as on data without them (by replacing D→P and X→$X_0$).

FIG. 7 demonstrates that the extension of our deghosting algorithm to a version that is based on expression (26) indeed allows for deghosting. FIG. 7 shows results on a simple one-reflector model similar to the one used in FIGS. 1 and 2, using residual (26), i.e., with sparseness but without simultaneous multiple attenuation. Random noise with an SNR between 1 and 1000 was added to the input data before running the deghosting flow. Curve 14 depicts the input;

curve 13 shows the corresponding deghosting results. The stability of the deghosted spectra 13 for varying values of SNR illustrates the robustness of our deghosting workflow in the presence of noise.

Having established that the contribution of surface multiples to our deghosting functionality is only of secondary importance, we now aim at focusing on the significance of sparseness, this being the second type of information that our deghosting workflow uses. To assess this importance, we consider the following additional simplification of residual (26):

$$V^{(p)}=D^{(p)}-L^{(r)}QL^{(s)}, \qquad (27)$$

with Q the (initially unknown) deghosted data. Expression (27) is solved for without any additional constraints applied. That is, whereas residuals (25) and (26) are minimized using a sparseness strategy, we now aim at minimizing residual (27) without such constraint. FIG. 8 shows the spectra of the resulting deghosted data on a simple synthetic one-reflector model that is similar to what was used in FIGS. 1, 2 and 7. Random noise with an SNR between 1 and 1000 was added to the input data before running the deghosting flow. We observe that the quality of the deghosted result is poor and unstable with respect to noise, which illustrates that residual (27) does not allow for proper deghosting. This in turn implies that sparseness is the crucial element that ensures the success of our deghosting flow, for both residual (25) and (26).

As described above, the deghosting method according to the invention is formulated as an extension of the sparse-inversion multiple attenuation framework. One key advantage of such formulation is that the deghosting algorithms according to the invention can be fairly straightforwardly incorporated into other sparse-inversion developments.

For example, we may extend the recently-introduced OBC EPSI formulation ([4]) to include source-deghosting. In addition, we may enhance EPSI-enabled shallow hazard detection ([16]) through deghosting-enabled bandwidth broadening. On an implementation level, we believe our deghosting algorithms can be included in existing EPSI schemes ([5, 7, 18, 17]), in principle irrespective of their minimization methodology.

Besides being able to share the virtues of the EPSI framework, our multiple-based deghosting method (25) inherently shares EPSI's challenges as well.

As was illustrated in, e.g., [11], the most pronounced of these is to extend EPSI beyond 2D and formulate an EPSI scheme that allows for full 3D processing. Such 3D implementation is challenging in at least two senses. First, the relatively slow convergence of the current EPSI formulations implies that they have a high processing cost associated with them.

As a mitigation procedure, we may formulate our multiple-based formulation (26) in the image domain using data blending (Verschuur and Berkhout (2011)); in contrast, our extension (26) does not require simultaneous multiple attenuation and converges much faster, and is therefore not hampered by a high processing cost.

The second challenge when aiming at a 3D implementation is to provide an areal sampling that is dense enough (in particular in the cross-line) to accurately perform necessary convolutions such as (11). For our multiple-based deghosting formulation, an image-domain formulation may again help in overcoming these sampling issues. Conversely, a 3D implementation of our extension (26) in principle only requires the incorporation of a crossline component in the spatial Fourier transformations such as (8). This cross-line information may either be again supplied by dense sampling, or by applying previously published techniques such as [20].

Some final observations are provided below.

In this description two novel deghosting techniques based on sparse-inversion multiple attenuation have been introduced.

Key features of these two novel deghosting techniques are:
  They are formulated as a pre-stack processing flow, running on single-source single-depth hydrophone data.
  As such, they do not rely on novel acquisition techniques.
  They allow for the simultaneous deghosting of source- and receiver-ghosts.
  The first of our techniques focuses on simultaneous deghosting and attenuation of surface multiples; the second focuses on deghosting only. They produce deghosting results of similar quality.

To illustrate the accuracy of our methods, we presented several results. First, we used synthetic tests to show that our deghosting results are stable in the presence of noise. Second, we showed that they can be matched to a synthetically modelled reference, underpinning the accuracy of our output.

LIST OF 20 SCIENTIFIC PUBLICATIONS CITED IN THIS SPECIFICATION

[1] Berkhout, A. J. *Seismic migration: Imaging of acoustic energy by wavefield extrapolation: A: Theoretical aspects*. Elsevier, Amsterdam-Oxford-New York, 1982.

[2] Billette, F. J. and Brandsberg-Dahl, S. The 2004 BP velocity benchmark. *67th Conference and Technical Exhibition, EAGE, Expanded Abstracts*, 2005.

[3] FB. PGS tackles the source of ghosts. *First Break*, 29:33, 2011.

[4] van Groenestijn, G. J. A., and Ross, W. Primary estimation on OBC data by sparse inversion. *SEG San Antonio 2011 Annual Meeting*, pages 3531-3535, 2011. SEG San Antonio 2011 Annual Meeting.

[5] van Groenestijn, G. J. A., and Verschuur, D. J. Estimation of primaries and near-offset reconstruction by sparse inversion: Marine data applications. *Geophysics*, 74:R119-R128, 2009.

[6] Kragh, E., and Svendsen, M., and Kapadia, D., and Busanello, G., and Goto, R., and Morgan, G., and Muyzert, E., and Curtis, T. Variable-depth streamer acquisition—broadband data for imaging and inversion. *71st EAGE Conference & Exhibition*, 2009.

[7] Lin, T. T. Y., and Herrmann, F. J. Robust source signature deconvolution and the estimation of primaries by sparse inversion. *SEG San Antonio 2011 Annual Meeting*, pages 4354-4359, 2011.

[8] Moldoveanu, N. Vertical source array in marine seismic exploration. *SEG 2000 Annual meeting, pages 53-56*, 2000.

[9] Posthumus, B. J. Deghosting using a twin streamer configuration. *Geophysical Prospecting*, 41:267-286, 1993.

[10] Sablon, R., and Gao, Y., and Cavalie, A., and Morelli, B., and Gratacos, B., and Soubaras, R., and Whiting, P., and Lin, D. Processing Variable-depth Streamer Data—First Attempt. *73rd EAGE Conference & Exhibition*, 2011.

[11] Savels, T., and De Vos, K., and De Maag, J. W. Surface-multiple attenuation through sparse inversion: results for complex synthetics and real data. *First Break*, 29:55-64, 2011.

[12] Soubaras, R. Deghosting by joint deconvolution of a migration and a mirror migration. *SEG Denver 2010 Annual Meeting*, pages 3406-3410, 2010.

[13] Soubaras, R. and Lafet, Y. Variable-depth streamer acquisition—broadband data for imaging and inversion. *73rd EAGE Conference & Exhibition*, 2011.

[14] Soubaras, R. and Whiting, P. Variable Depth Streamer—The New Broadband Acquisition System. *SEG San Antonio 2011 Annual Meeting*, pages 4349-4353, 2011.

[15] Tenghamn, R. and Dhelie, P. E. Geostreamer—increasing the signal-to-noise ratio using a dual-sensor towed streamer. *First Break*, 27:45-51, 2009.

[16] Toxopeus, G., and van Borselen, R., and Baardman, R. H., and Auer, L., and Odegaard, E. Advanced Geohazards Assessment in Shallow Water through the Estimation of Primaries by Sparse Inversion. *SEG San Antonio 2011 Annual Meeting*, pages 3526-3530, 2011.

[17] Tu, N., and Lin, T. T. Y., and Herrmann, F. J. Migration with surface-related multiples from incomplete seismic data. *SEG San Antonio 2011 Annual Meeting*, pages 3222-3227, 2011.

[18] Verschuur, D. J., and Berkhout, A. J. Seismic migration of blended shot records with surface-related multiple scattering. *Geophysics*, 76, 2011.

[19] Van Borselen, R. G., Fokkema, J. T. and van den Berg, P. M., Removal of surface-related wave phenomena—The marine case. *Geophysics*, 61, 1996.

[20] Klüver, T., P. Aaron, D. Carlson, A. Day, and R. van Borselen. A robust strategy for processing 3d dual-sensor towed streamer data. *SEG Houston 2009 International Exposition and Annual Meeting*, pages 3088-3092, 2009.

The invention claimed is:

1. A method comprising:
deghosting seismic data of a subsurface area acquired by a marine seismic source and receiver assembly, wherein effects of seismic reflections by the water surface, known as ghost signals, are removed by a deghosting algorithm which transforms input seismic data with the surface ghost reflections into source-deghosted and receiver-deghosted seismic data, thereby generating an output of deghosted primaries, using a sparse-inversion technique, wherein the deghosting algorithm comprises a minimization scheme based on the formula $$V^{(a)}(\omega)=D^{(a)}(\omega)-G^{(r)}(\omega)X(\omega)G^{(s)}(\omega)W(\omega), \forall \omega$$

where the matrices $V^{(a)}(\omega)$ denote residual terms such that $V^{(a)}_{rs}(\omega)$ is the residual at frequency $\omega$ of the signal from source s at receiver r, the matrices $D^{(a)}(\omega)$ denote acquired data with or without multiples, the matrices $X(\omega)$ denote ghost-free data, the matrices $W(\omega)$ denote the wavelet information, and the matrices $G^{(s,r)}(\omega)$ denote ghost functions, the latter being defined as $$G^{(s)}(x_{s'},x_s,\omega)=\int dk_{\|}e^{ik_{\|}(x_s-x_{s'})}\gamma^{(s)}(k_\perp,z_s),$$

$$G^{(r)}(x_r,x_{r'},\omega)=\int dk_{\|}e^{ik_{\|}(x_{r'}-x_r)}\gamma^{(r)}(k_\perp,z_r),$$

$$\gamma^{(r)}(k_\perp,z_r)=2i\,\sin(k_\perp z_r),$$

$$\gamma^{(s)}(k_\perp,z_s)=2i\,\sin(k_\perp z_s)/(2i\,k_\perp z_s),$$

$$(\omega/c)^2=(k_{\|})^2+(k_\perp)^2,$$

with c the p-wave velocity of the subsurface top layer and $z_{s,r}$ the depth of source (s) and receiver (r); and
generating an image of the output after subsequent reverse-time migration.

2. The method of claim 1, wherein the deghosting algorithm comprises a minimization scheme based on the formula $$V^{(p)}(\omega)=D^{(p)}(\omega)-\tilde{G}^{(r)}(\omega)G^{(r)}(\omega)X(\omega)G^{(s)}(\omega)\tilde{G}^{(s)}(\omega)W(\omega), \forall \omega$$

where the matrices $V^{(p)}(\omega)$ denote preconditioned residual terms defined as $$V^{(p)}(\omega)=\tilde{G}^{(r)}(\omega)V^{(a)}(\omega)\tilde{G}^{(s)}(\omega), \forall \omega,$$

the matrices $D^{(p)}(\omega)$ denote preconditioned data terms defined as $$D^{(p)}(\omega)=\tilde{G}^{(r)}(\omega)D^{(a)}(\omega)\tilde{G}^{(s)}(\omega), \forall \omega,$$

and the matrices $\tilde{G}^{(s,r)}(\omega)$ denote preconditioning functions, defined as $$\tilde{G}^{(s)}(x_{s'},x_s,\omega)=\int dk_{\|}e^{ik_{\|}(x_s-x_{s'})}\tilde{\gamma}^{(s)}(k_\perp,z_s),$$

$$\tilde{G}^{(r)}(x_r,x_{r'},\omega)=\int dk_{\|}e^{ik_{\|}(x_{r'}-x_r)}\tilde{\gamma}^{(r)}(k_\perp,z_r),$$

$$\tilde{\gamma}^{(r)}=\frac{\gamma^{(r)}}{|\gamma^{(r)}|^2+\epsilon},\,\tilde{\gamma}^{(s)}=\frac{\gamma^{(s)}}{|\gamma^{(s)}|^2+\epsilon},$$

with $\epsilon \ll 1$.

3. The method of claim 2, wherein the deghosting algorithm comprises a minimization scheme based on the formula $$V^{(a)}(\omega)=D^{(a)}(\omega)-G^{(r)}(\omega)X_0(\omega)G^{(s)}(\omega)W(\omega)+G^{(r)}(\omega)X_0(\omega)[G^{(r)}(\omega)]^{-1}D^{(a)}(\omega), \forall \omega$$

where the matrices $V^{(a)}(\omega)$ denote residual terms such that $V^{(a)}_{rs}(\omega)$ is the residual at frequency $\omega$ of the signal from source s at receiver r, the matrices $D^{(a)}(\omega)$ denote acquired data with multiples, the matrices $X_0(\omega)$ denote ghost-free and surface-multiple free data, the matrices $W(\omega)$ denote the wavelet information, and the matrices $G^{(s,r)}(\omega)$ denote ghost functions, the latter being defined as $$G^{(s)}(x_{s'},x_s,\omega)=\int dk_{\|}e^{ik_{\|}(x_s-x_{s'})}\gamma^{(s)}(k_\perp,z_s),$$

$$G^{(r)}(x_r,x_{r'},\omega)=\int dk_{\|}e^{ik_{\|}(x_{r'}-x_r)}\gamma^{(r)}(k_\perp,z_r),$$

$$\gamma^{(r)}(k_\perp,z_r)=2i\,\sin(k_\perp z_r),$$

$$\gamma^{(s)}(k_\perp,z_s)=2i\,\sin(k_\perp z_s)/(2i\,k_\perp z_s),$$

$$(\omega/c)^2=(k_{\|})^2+(k_\perp)^2,$$

with c the p-wave velocity of the subsurface top layer and $z_{s,r}$ the depth of source (s) and receiver (r).

4. The method of claim 3, wherein the deghosting algorithm comprises a minimization scheme based on the formula $$V^{(a)}(\omega)=D^{(a)}(\omega)-\tilde{G}^{(r)}(\omega)G^{(r)}(\omega)X_0(\omega)G^{(s)}(\omega)\tilde{G}^{(s)}(\omega)W(\omega)+\tilde{G}^{(r)}(\omega)G^{(r)}(\omega)X_0(\omega)[\tilde{G}^{(r)}(\omega)G^{(r)}(\omega)]^{-1}D^{(p)}(\omega), \forall \omega$$

where the matrices $V^{(p)}(\omega)$ denote preconditioned residual terms defined as $$V^{(p)}(\omega)=\tilde{G}^{(r)}(\omega)V^{(a)}(\omega)\tilde{G}^{(s)}(\omega), \forall \omega,$$

the matrices $D^{(p)}(\omega)$ denote preconditioned data terms defined as $$D^{(p)}(\omega)=\tilde{G}^{(r)}(\omega)D^{(a)}(\omega)\tilde{G}^{(s)}(\omega), \forall \omega,$$

and the matrices $\tilde{G}^{(s,r)}(\omega)$ denote preconditioning functions, defined as $$\tilde{G}^{(s)}(x_{s'}, x_s, \omega) = \int dk_{\parallel} e^{ik_{\parallel}(x_s - x_{s'})} \tilde{\gamma}^{(s)}(k_{\perp}, z_s),$$

$$\tilde{G}^{(r)}(x_r, x_{r'}, \omega) = \int dk_{\parallel} e^{ik_{\parallel}(x_{r'} - x_r)} \tilde{\gamma}^{(r)}(k_{\perp}, z_r),$$

$$\tilde{\gamma}^{(r)} = \frac{\gamma^{(r)}}{|\gamma^{(r)}|^2 + \epsilon}, \tilde{\gamma}^{(s)} = \frac{\gamma^{(s)}}{|\gamma^{(s)}|^2 + \epsilon},$$

with $\epsilon \ll 1$.

5. The method of claim 4, wherein the residual is approximated by $$V^{(p)}(\omega)=D^{(p)}(\omega)-\tilde{G}^{(r)}(\omega)G^{(r)}(\omega)X_0(\omega)G^{(s)}(\omega)\tilde{G}^{(s)}(\omega)W(\omega)+X_0(\omega)D^{(p)}(\omega), \forall \omega$$

by making the assumption that $$\int dk_x e^{ik_x(x-x')} \tilde{\gamma}^{(i)}(k_z, z_i) \gamma^{(i)}(k_z, z_i) \sim \delta(x-x') \text{ for } i=s,r,$$

of which the validity stems from the fact that $\gamma^{(i)} \tilde{\gamma}^{(i)} \approx 1$ away from the ghost notches.

6. The method of claim 1, wherein the marine seismic source and a receiver assembly comprises fixed-depth hydrophones.

* * * * *

UNITED STATES PATENT AND TRADEMARK OFFICE
CERTIFICATE OF CORRECTION

PATENT NO. : 11,209,562 B2
APPLICATION NO. : 14/441225
DATED : December 28, 2021
INVENTOR(S) : Tom Savels et al.

Page 1 of 1

It is certified that error appears in the above-identified patent and that said Letters Patent is hereby corrected as shown below:

In the Specification

In Column 7, Line 58, delete " $\tilde{G}^{(r)}(x_r, x_{r'}, \omega) = \int dk_x e^{ik_x(x_{r'} - s_r)} \tilde{\gamma}^{(r)}(k_z, z_r)$ " and insert -- $\tilde{\mathbf{G}}^{(r)}(x_r, x_{r'}, \omega) = \int dk_x e^{ik_x(x_{r'} - x_r)} \tilde{\gamma}^{(r)}(k_z, z_r)$ --.

In the Claims

In Column 14, Line 61, in Claim 4, delete "$V^{(a)}(\omega) = D^{(a)}(\omega)$" and insert -- $V^{(p)}(\omega) = D^{(p)}(\omega)$ --.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*